(12) United States Patent
Harkness

(10) Patent No.: US 10,137,988 B2
(45) Date of Patent: Nov. 27, 2018

(54) TOILET SYSTEM AND METHOD OF ASSEMBLING

(71) Applicant: The Boeing Company, Chicago, IL (US)

(72) Inventor: William Anthony Harkness, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 157 days.

(21) Appl. No.: 15/098,053

(22) Filed: Apr. 13, 2016

(65) Prior Publication Data

US 2017/0297715 A1 Oct. 19, 2017

(51) Int. Cl.
| | |
|---|---|
| E03D 1/00 | (2006.01) |
| B64D 11/02 | (2006.01) |
| A47K 11/02 | (2006.01) |
| B65G 33/14 | (2006.01) |

(52) U.S. Cl.
CPC .............. *B64D 11/02* (2013.01); *A47K 11/02* (2013.01); *B65G 33/14* (2013.01)

(58) Field of Classification Search
CPC ................................. B64D 11/02; A47K 11/02
USPC ...................................................... 4/479, 321
See application file for complete search history.

(56) References Cited

U.S. PATENT DOCUMENTS

| | | | | |
|---|---|---|---|---|
| 3,786,923 A | | 1/1974 | Schmidt | |
| 3,882,552 A | * | 5/1975 | Turner | A47K 11/023 210/167.3 |
| 4,546,502 A | * | 10/1985 | Lew | A47K 11/02 4/111.1 |
| 4,633,535 A | * | 1/1987 | Louvo | A47K 11/03 366/233 |
| 5,289,595 A | | 3/1994 | Roche | |
| 6,112,338 A | * | 9/2000 | Sundberg | A47K 11/02 366/186 |
| 7,005,077 B1 | * | 2/2006 | Brenner | B63B 29/16 100/117 |

FOREIGN PATENT DOCUMENTS

| | | |
|---|---|---|
| CN | 101265004 A | 9/2008 |
| CN | 102583826 A | 7/2012 |
| CN | 103241919 A | 8/2013 |
| DE | 10100962 A1 | 7/2002 |
| EP | 0702658 A1 | 3/1996 |
| GB | 2238045 A | 5/1991 |
| WO | 9822010 A1 | 5/1998 |

OTHER PUBLICATIONS

Great Britain Search and Examination Report for related application GB1705985.8 dated Oct. 4, 2017, 6 pp.

* cited by examiner

*Primary Examiner* — Huyen Le
(74) *Attorney, Agent, or Firm* — Amstrong Teasdale LLP

(57) ABSTRACT

A toilet system that includes a waste receptacle including an outlet configured to channel waste therethrough. The system also includes a conveyor assembly including a housing that includes an inlet and at least one outlet. The inlet is coupled in flow communication with the outlet of the waste receptacle. The conveyor assembly also includes a transport mechanism positioned within the housing, and the transport mechanism is operable to actively transport the waste from the inlet towards the at least one outlet of said housing.

17 Claims, 3 Drawing Sheets

TOILET SYSTEM AND METHOD OF ASSEMBLING

BACKGROUND

The field of the present disclosure relates generally to waste transport mechanisms and, more specifically, to a simplified and efficient toilet system for use with an aircraft lavatory.

Current aircraft lavatories are typically single, small units that include a toilet receptacle and a sink. Once the toilet receptacle has been used, many known aircraft lavatories include a vacuum system for flushing waste from the toilet receptacle. More specifically, the vacuum system utilizes a pressure differential between the pressurized aircraft cabin and an ambient environment outside the aircraft when in flight to flush waste from the toilet receptacle. When not in flight, or when the differential pressure is less than a predetermined threshold, a powerful suction device must be used to flush waste from the toilet receptacle. As such, the vacuum system is loud, and generally requires a complex network of piping and conduits. Moreover, liquid detergent is also typically used in the toilet receptacle when flushing waste therefrom with the vacuum system. Storing and transporting liquid detergent reduces valuable storage volume and adds weight to the aircraft, thereby reducing the fuel efficiency of the aircraft. Moreover, liquid detergent storage systems have been known to leak, causing frozen liquid detergent to fall from the sky and onto unsuspecting people, buildings, and objects below.

BRIEF DESCRIPTION

In one aspect, a toilet system is provided. The toilet system includes a waste receptacle including an outlet configured to channel waste therethrough. The system also includes a conveyor assembly including a housing that includes an inlet and at least one outlet. The inlet is coupled in flow communication with the outlet of the waste receptacle. The conveyor assembly also includes a transport mechanism positioned within the housing, and the transport mechanism is operable to actively transport the waste from the inlet towards the at least one outlet of said housing.

In another aspect, an aircraft is provided. The aircraft includes a toilet system. The toilet system includes a waste receptacle including an outlet configured to channel waste therethrough. The system also includes a conveyor assembly including a housing that includes an inlet and at least one outlet. The inlet is coupled in flow communication with the outlet of the waste receptacle. The conveyor assembly also includes a transport mechanism positioned within the housing, and the transport mechanism is operable to actively transport the waste from the inlet towards the at least one outlet of said housing.

In yet another aspect, a method of assembling a toilet system for use in an aircraft is provided. The method includes coupling an inlet of a housing in flow communication with an outlet of a waste receptacle. The outlet configured to channel waste therethrough. The method also includes positioning a transport mechanism within the housing, and the transport mechanism is operable to actively transport the waste from the inlet towards at least one outlet of the housing.

DETAILED DESCRIPTION

The implementations described herein relate to a simplified, self-contained, and energy efficient toilet system for use with an aircraft lavatory, for example. The toilet system described herein includes a waste receptacle (i.e., a toilet bowl) and a conveyor assembly coupled to the waste receptacle. The conveyor assembly is capable of transporting waste from the waste receptacle towards one or more storage vessels without the use of a vacuum system. More specifically, the conveyor assembly includes a housing that receives the waste directly from the waste receptacle, and a transport mechanism positioned within the housing. The transport mechanism actively transports the waste towards the one or more storage vessels via a mechanical device, rather than by a system that induces a vacuum pressure of up to about 10 pounds per square inch (psi). As such, the toilet system described herein operates at a low noise level, and has a reduced weight and complexity when compared to known toilet systems that utilize vacuum suction. Moreover, the toilet system described herein does not require the use of liquid detergent when flushing waste from the waste receptacle. As such, the waste is capable of being separated into solid and liquid components, which enables the solid component to be used in compost or fertilizer.

As used herein, an element or step recited in the singular and proceeded with the word "a" or "an" should be understood as not excluding plural elements or steps, unless such exclusion is explicitly recited. Furthermore, references to "exemplary implementation" or "one implementation" of the present disclosure are not intended to be interpreted as excluding the existence of additional implementations that also incorporate the recited features.

Figure 1:
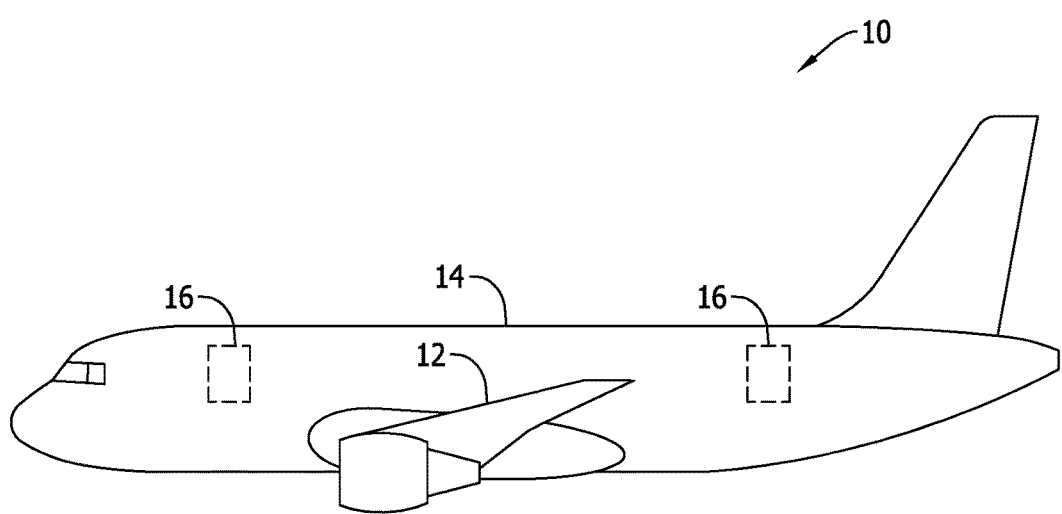
FIG. 1 is a schematic illustration of an exemplary aircraft.

Referring to the drawings, implementations of the disclosure may be described in the context of an aircraft 10 shown schematically in FIG. 1. Aircraft 10 includes at least one wing 12 that extends from a fuselage 14. Aircraft 10 also includes at least one lavatory 16 located in fore and aft sections of aircraft 10. The plurality of structures shown on aircraft 10 is for illustrative purposes only, and it should be understood that aircraft 10 additionally includes a large number of other structures. Moreover, it should be understood that, although an aerospace example is shown, the principles of the disclosure may be applied to other structures, such as a maritime structure or an automotive structure.

Figure 2:
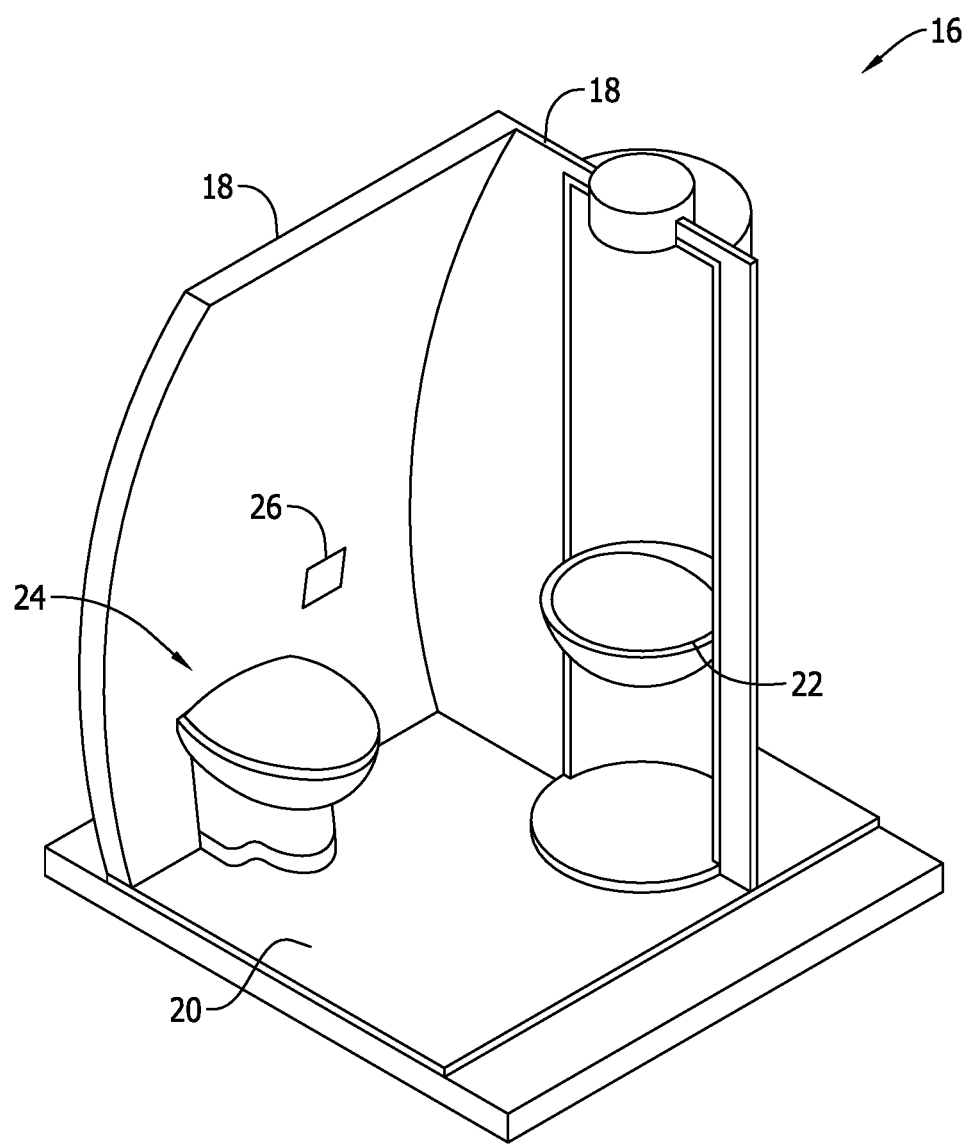
FIG. 2 is an illustration of an exemplary lavatory that may be used in the aircraft shown in FIG. 1.
Figure 3:
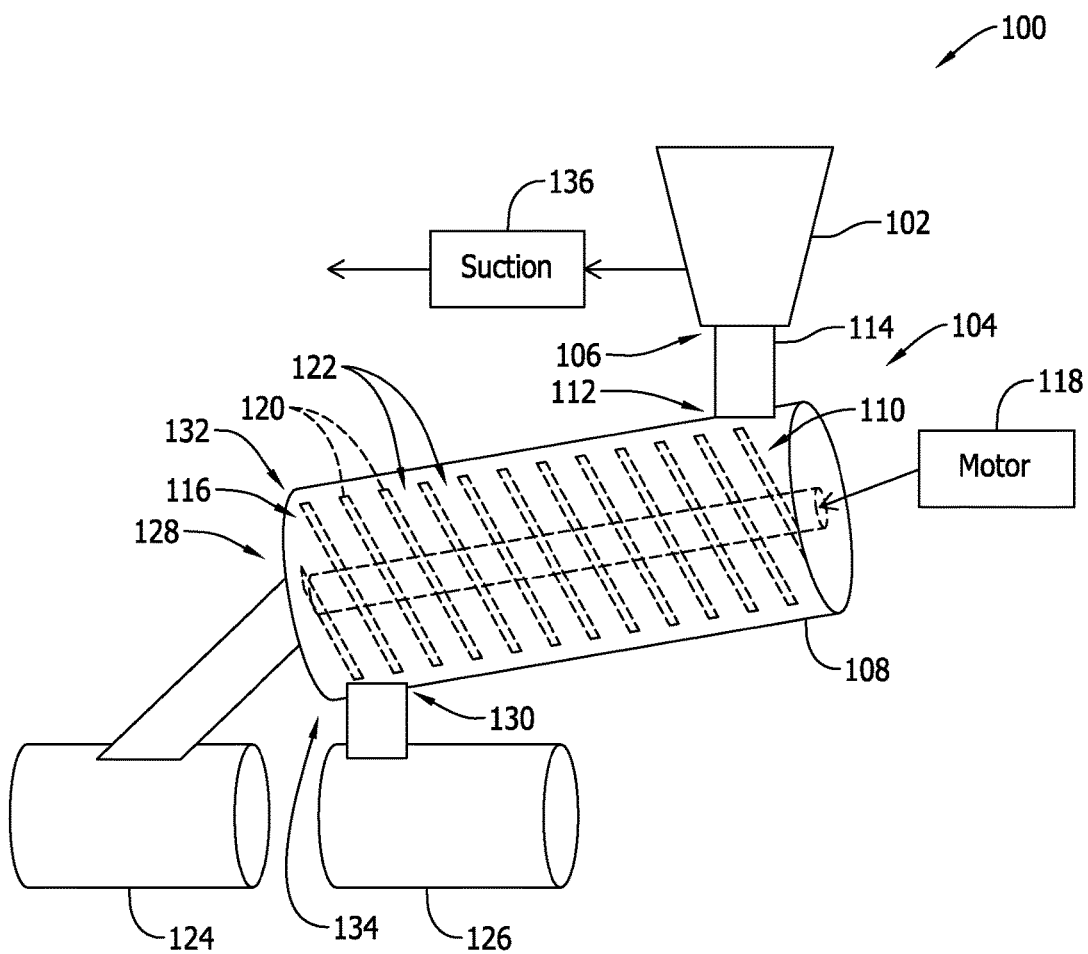
FIG. 3 is a schematic illustration of an exemplary toilet system that may be used with the lavatory shown in FIG. 2.

FIG. 2 is an illustration of an exemplary lavatory 16 that may be used in aircraft 10 (shown in FIG. 1), and FIG. 3 is a schematic illustration of an exemplary toilet system that may be used with lavatory 16. Referring to FIG. 2, lavatory 16 is at least partially defined by side walls 18 and a floor 20. Lavatory 16 also includes a sink 22, a toilet 24, and a user interface 26. As will be described in more detail below, user interface 26 enables a user to selectively activate and remove waste from toilet 24.

Referring to FIG. 3, toilet system 100 includes a waste receptacle 102 of toilet 24 (shown in FIG. 2), and a conveyor assembly 104. Waste receptacle 102 includes an outlet 106 that channels waste there through. Conveyor assembly 104 includes a housing 108 and a transport mechanism 110 positioned within housing 108. Housing 108 includes an inlet 112 and at least one outlet, as will be described in more detail below. Inlet 112 of housing 108 is coupled in flow communication with outlet 106 of waste receptacle 102, such that waste is transferable from waste receptacle 102 to housing 108. More specifically, outlet 106 of waste receptacle 102 and inlet 112 of housing 108 are positioned for gravitational alignment, such as when aircraft 10 (shown in FIG. 1) is in straight and level operation. As such, the waste is transferable from waste receptacle 102 to housing 108 without the use of an active flushing device or powerful vacuum suction system. More specifically, outlet 106 of waste receptacle 102 is not coupled in selective flow communication with an ambient environment outside aircraft 10, which would create a negative pressure within waste receptacle 102 via the pressure differential between the ambient environment and the pressurized lavatory 16. In one implementation, a conduit 114 extends between outlet 106 of waste receptacle 102 and inlet 112 of housing 108.

In the exemplary implementation, transport mechanism 110 is operable to actively transport the waste received at inlet 112, from inlet 112 and towards the at least one outlet of housing 108. Transport mechanism 110 is any device capable of mechanically transporting solid or liquid material from one location to another location. For example, as shown in FIG. 3, transport mechanism 110 includes a worm screw device 116 and a motor 118 coupled to worm screw device 116. Worm screw device 116 includes threads 120 and a space 122 defined between adjacent threads 120 for receiving waste therein. As such, motor 118 rotates worm screw device 116 such that the waste is progressively transported towards the at least one outlet of housing 108. Another suitable transport mechanism includes, but is not limited to, a translating piston device. Moreover, motor 118 is powered by any suitable power source such as electric power, and pneumatic power (e.g., bleed air from an engine of aircraft 10).

In operation, motor 118 either operates worm screw device 116 continuously, at predetermined intervals, or when activated by a user of lavatory 16. For example, user interface 26 (shown in FIG. 2) is coupled in communication with motor 118, and motor 118 is selectively activated upon actuation at user interface 26. More specifically, in one implementation, activating motor 118 from user interface 26 causes motor 118 to operate for a predetermined amount of time that causes worm screw device 116 to rotate for a predetermined number of revolutions that ensures the solid waste is received within solid storage vessel 124 and the liquid waste is received within liquid storage vessel 126.

As described above, housing 108 includes at least one outlet. More specifically, housing 108 includes a solid waste outlet 128 and a liquid waste outlet 130. Solid waste outlet 128 is positioned to receive solid waste transported by transport mechanism 110, and liquid waste outlet 130 is positioned to receive liquid waste separated from the solid waste. For example, when embodied as worm screw device 116, transport mechanism 110 compresses the waste to separate the liquid waste and the solid waste as the waste is progressively transported through housing 108. As such, the solid waste remains coupled to worm screw device 116 and solid waste outlet 128 is formed at a discharge end 132 of worm screw device 116. Moreover, in one implementation, housing 108 is tilted such that the liquid waste is collected at a lower end 134 of housing 108. As such, tilting housing 108 facilitates gravity draining the liquid waste from housing 108, and liquid waste outlet 130 is formed at lower end 134 to receive the collected liquid waste.

Toilet system 100 also includes a solid storage vessel 124 and a liquid storage vessel 126. Solid storage vessel 124 is coupled in flow communication with solid waste outlet 128, and liquid storage vessel 126 is coupled in flow communication with liquid waste outlet 130. The solid waste and the liquid waste are stored in separate vessels to enable the solid waste to be easily converted to compost or fertilizer in the future.

In the exemplary implementation, toilet system 100 further includes a suction device 136 coupled in flow communication with waste receptacle 102. Suction device 136 is operable to create a negative pressure within waste receptacle 102 such that offensive fumes are inhibited from flowing into lavatory 16. More specifically, suction device 136 creates a significantly lower negative pressure within waste receptacle 102 than known the known vacuum systems described above. For example, atmospheric pressure at sea level is about 14.7 psi, and the pressure of the ambient environment outside aircraft 10 when cruising at altitudes of greater than about 30,000 feet is about 4.0 psi, thereby defining a differential pressure of greater than 10.0 psi. As such, in one implementation, suction device 136 creates a negative pressure within waste receptacle 102 of less than about 10 psi. More specifically, suction device 136 creates a negative pressure within waste receptacle 102 of less than about 5 psi and, even more specifically, of less than about 1.0 psi.

A method of assembling toilet system 100 for use in aircraft 10 is also described herein. The method includes coupling inlet 112 of housing 108 in flow communication with outlet 106 of waste receptacle 102, and positioning transport mechanism 110 within housing 108. Outlet 106 is configured to channel waste therethrough, and transport mechanism 110 is operable to actively transport the waste from inlet 112 towards at least one outlet of housing 108.

The method also includes orienting housing 108 and waste receptacle 102 such that outlet 106 of waste receptacle 102 and inlet 112 of housing 108 are positioned for gravitational alignment when aircraft 10 is in straight and level operation. Further, the method includes forming solid waste outlet 128 and liquid waste outlet 130 in housing 108. Solid waste outlet 128 is positioned to receive solid waste transported by transport mechanism 110, and liquid waste outlet 130 is positioned to receive liquid waste separated from the solid waste. In one implementation, the method further includes coupling solid storage vessel 124 in flow communication with solid waste outlet 128, and coupling liquid storage vessel 126 in flow communication with liquid waste outlet 130.

Moreover, in one implementation, positioning transport mechanism 110 includes positioning worm screw device 116 within housing 108, and coupling motor 118 to worm screw device 116. Motor 118 is configured to rotate worm screw device 116 such that the waste is progressively transported towards the at least one outlet of housing 108.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:
1. A toilet system comprising:
 a waste receptacle comprising an outlet configured to channel waste therethrough; and
 a conveyor assembly comprising:
  a housing that comprises an inlet and at least one outlet comprising a solid waste outlet and a liquid waste outlet, said inlet coupled in direct flow communication with said outlet of said waste receptacle such that both liquid waste and solid waste are received within said housing from said waste receptacle, said solid waste outlet positioned to receive solid waste transported by said transport mechanism, and said liquid waste outlet positioned to receive liquid waste separated from the solid waste; and
  a transport mechanism positioned within said housing, said transport mechanism operable to actively transport the waste from said inlet towards said at least one outlet of said housing.

2. The system in accordance with claim 1, wherein said outlet of said waste receptacle and said inlet of said housing are positioned for gravitational alignment.

3. The system in accordance with claim 2 further comprising:
 a solid storage vessel coupled in flow communication with said solid waste outlet; and
 a liquid storage vessel coupled in flow communication with said liquid waste outlet.

4. The system in accordance with claim 1 further comprising a suction device coupled in flow communication with said waste receptacle, said suction device configured to create a negative pressure within said waste receptacle of less than about 5 pounds per square inch.

5. The system in accordance with claim 1, wherein said transport mechanism comprises:
 a worm screw device; and
 a motor coupled to said worm screw device, said motor configured to rotate said worm screw device such that the waste is progressively transported towards said at least one outlet of said housing.

6. The system in accordance with claim 5 further comprising a user interface coupled in communication with said motor, wherein said motor is selectively activated upon actuation at said user interface.

7. An aircraft comprising:
 a toilet system comprising:
  a waste receptacle comprising an outlet configured to channel waste therethrough; and
  a conveyor assembly comprising:
   a housing that comprises an inlet and at least one outlet comprising a solid waste outlet and a liquid waste outlet, said inlet coupled in direct flow communication with said outlet of said waste receptacle such that both liquid waste and solid waste are received within said housing from said waste receptacle, said solid waste outlet positioned to receive solid waste transported by said transport mechanism, and said liquid waste outlet positioned to receive liquid waste separated from the solid waste; and
   a transport mechanism positioned within said housing, said transport mechanism operable to actively transport the waste from said inlet towards said at least one outlet of said housing.

8. The aircraft in accordance with claim 7, wherein said outlet of said waste receptacle and said inlet of said housing are positioned for gravitational alignment when the aircraft is in straight and level operation.

9. The aircraft in accordance with claim 8 further comprising:
 a solid storage vessel coupled in flow communication with said solid waste outlet; and
 a liquid storage vessel coupled in flow communication with said liquid waste outlet.

10. The aircraft in accordance with claim 7, wherein said outlet of said waste receptacle is not coupled in selective flow communication with an ambient environment outside the aircraft.

11. The aircraft in accordance with claim 7 further comprising a suction device coupled in flow communication with said waste receptacle, said suction device configured to create a negative pressure within said waste receptacle of less than about 5 pounds per square inch.

12. The aircraft in accordance with claim 7, wherein said transport mechanism comprises:
 a worm screw device; and
 a motor coupled to said worm screw device, said motor configured to rotate said worm screw device such that the waste is progressively transported towards said at least one outlet of said housing.

13. The aircraft in accordance with claim 12 further comprising a user interface coupled in communication with said motor, wherein said motor is selectively activated upon actuation at said user interface.

14. A method of assembling a toilet system for use in an aircraft, said method comprising:
 coupling an inlet of a housing in direct flow communication with an outlet of a waste receptacle such that both liquid waste and solid waste are received within said housing from said waste receptacle, the outlet configured to channel the liquid waste and the solid waste therethrough;
 positioning a transport mechanism within the housing, the transport mechanism operable to actively transport the waste from the inlet towards at least one outlet of the housing; and
 forming a solid waste outlet and a liquid waste outlet in the housing such that the solid waste outlet is positioned to receive solid waste transported by the transport mechanism, and such that the liquid waste outlet is positioned to receive liquid waste separated from the solid waste.

15. The method in accordance with claim 14 further comprising orienting the housing and the waste receptacle such that the outlet of the waste receptacle and the inlet of the housing are positioned for gravitational alignment when the aircraft is in straight and level operation.

16. The method in accordance with claim 15 further comprising:
 coupling a solid storage vessel in flow communication with the solid waste outlet; and
 coupling a liquid storage vessel in flow communication with the liquid waste outlet.

17. The method in accordance with claim 14, wherein positioning a transport mechanism comprises:
 positioning a worm screw device within the housing; and
 coupling a motor to the worm screw device, the motor configured to rotate the worm screw device such that the waste is progressively transported towards the at least one outlet of the housing.

\* \* \* \* \*